US009478349B2

(12) United States Patent
Yokoyama et al.

(10) Patent No.: US 9,478,349 B2
(45) Date of Patent: Oct. 25, 2016

(54) INDUCTOR ELEMENT

(71) Applicant: Murata Manufacturing Co., Ltd., Kyoto (JP)

(72) Inventors: Tomoya Yokoyama, Kyoto (JP); Koki Nishimura, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 91 days.

(21) Appl. No.: 14/621,771

(22) Filed: Feb. 13, 2015

(65) Prior Publication Data

US 2015/0162125 A1 Jun. 11, 2015

Related U.S. Application Data

(63) Continuation of application No. PCT/JP2013/068006, filed on Jul. 1, 2013.

(30) Foreign Application Priority Data

Sep. 25, 2012 (JP) ................................ 2012-211441

(51) Int. Cl.
*H01F 5/00* (2006.01)
*H01F 27/28* (2006.01)
(Continued)

(52) U.S. Cl.
CPC ...... *H01F 27/2804* (2013.01); *H01F 17/0033* (2013.01); *H01Q 1/40* (2013.01);
(Continued)

(58) Field of Classification Search
CPC ................................ H01F 5/00; H01F 27/28
USPC ................................................ 336/200, 232
See application file for complete search history.

(56) References Cited

U.S. PATENT DOCUMENTS

2005/0151613 A1 7/2005 Takaya
2005/0179514 A1* 8/2005 Yamamoto .......... H01F 17/0013 336/200

(Continued)

FOREIGN PATENT DOCUMENTS

JP 2004-304157 A 10/2004
JP 2007-049737 A 2/2007

(Continued)

OTHER PUBLICATIONS

International Search Report issued in Application No. PCT/JP2013/068006 dated Aug. 6, 2013.

(Continued)

*Primary Examiner* — Tsz Chan
(74) *Attorney, Agent, or Firm* — Pearne & Gordon LLP

(57) ABSTRACT

Line conductors are provided on one principal surface of a magnetic layer, and line conductors are provided on the other principal surface of the magnetic layer. In addition, side conductors are provided on side surfaces of the magnetic layer to connect the line conductors in a coil shape. A non-magnetic layer is stacked at the one principal surface side of the magnetic layer, and a non-magnetic layer is stacked at the other principal surface side of the magnetic layer. Line conductors are provided within the non-magnetic layer, and line conductors are provided within the non-magnetic layer. Via-hole conductors are provided within the non-magnetic layer to connect the line conductors in parallel with the line conductors. In addition, via-hole conductors are provided within the non-magnetic layer to connect the line conductors in parallel with the line conductors.

7 Claims, 17 Drawing Sheets

(51) Int. Cl.
*H01F 17/00* (2006.01)
*H01Q 7/00* (2006.01)
*H04B 5/00* (2006.01)
*H01Q 1/40* (2006.01)

(52) U.S. Cl.
CPC ............. *H01Q 7/00* (2013.01); *H04B 5/0075* (2013.01); *H01F 2017/0066* (2013.01); *H01F 2027/2809* (2013.01)

(56) References Cited

U.S. PATENT DOCUMENTS

2006/0049905 A1* 3/2006 Maeda ................ H01F 17/0013 336/200
2008/0129629 A1* 6/2008 Kimura ................ H01Q 1/2208 343/788
2011/0124299 A1 5/2011 Koujima
2012/0091210 A1* 4/2012 Koujima .......... G06K 19/07749 235/492

FOREIGN PATENT DOCUMENTS

JP 2009-284476 A 12/2009
WO 2013/038752 A1 3/2013

OTHER PUBLICATIONS

Written Opinion issued in Application No. PCT/JP2013/068006 dated Aug. 6, 2013.

* cited by examiner

FIG. 5 A PREPARE MOTHER SHEET
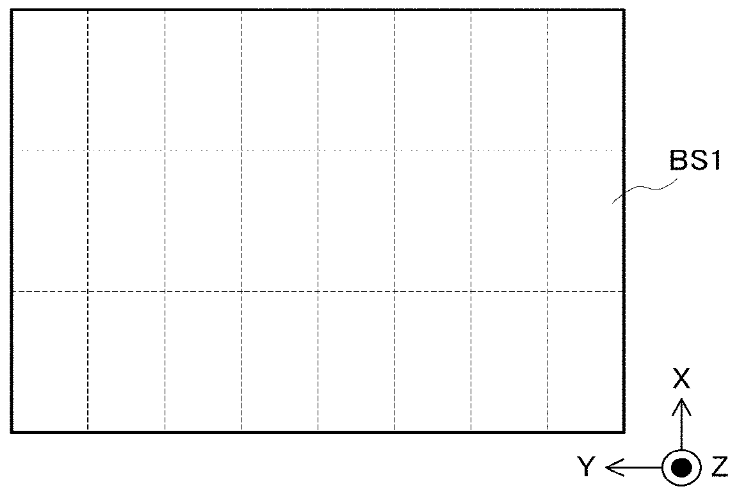
FIG. 5 B FORM THROUGH HOLES
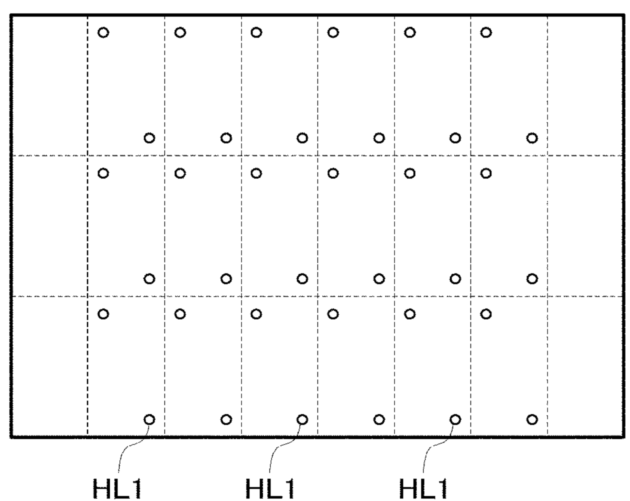

FIG. 6 A FILL CONDUCTIVE PASTE INTO HOLES
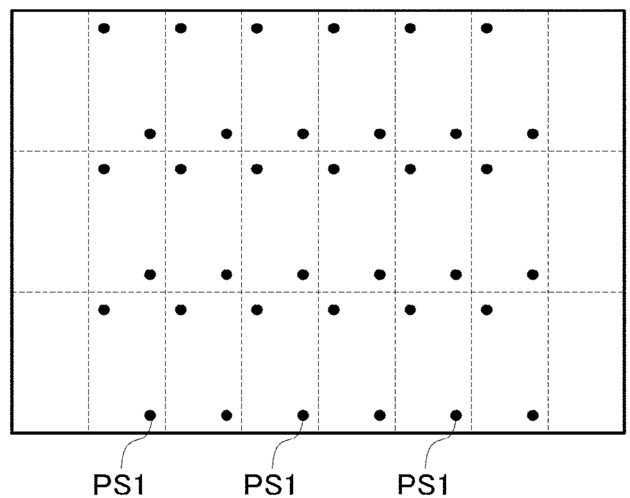
FIG. 6 B PRINT COIL PATTERNS
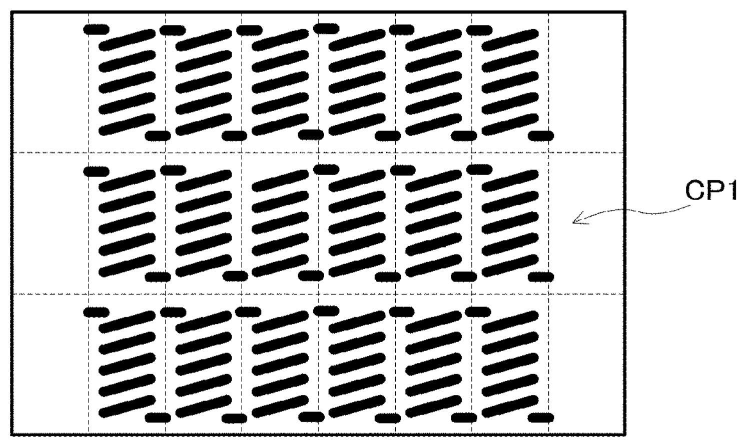

FIG. 7 A PREPARE MOTHER SHEET
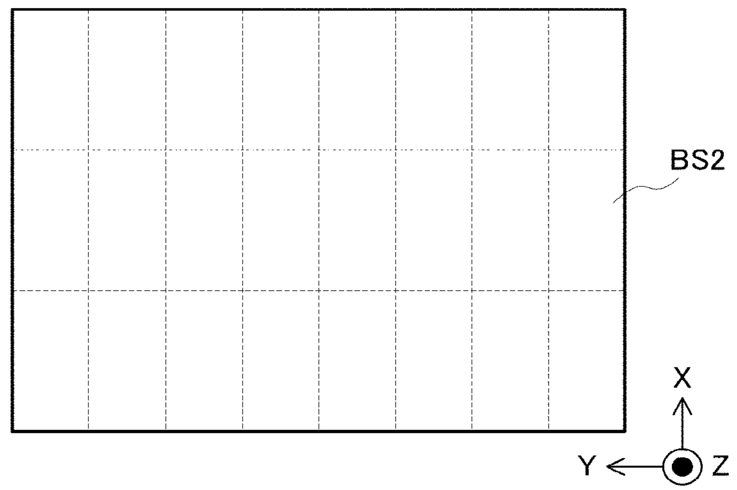
FIG. 7 B FORM THROUGH HOLES
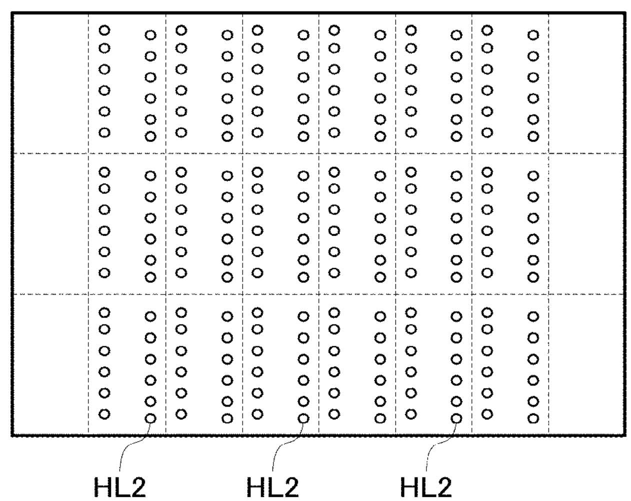

FIG. 8 A FILL CONDUCTIVE PASTE INTO HOLES
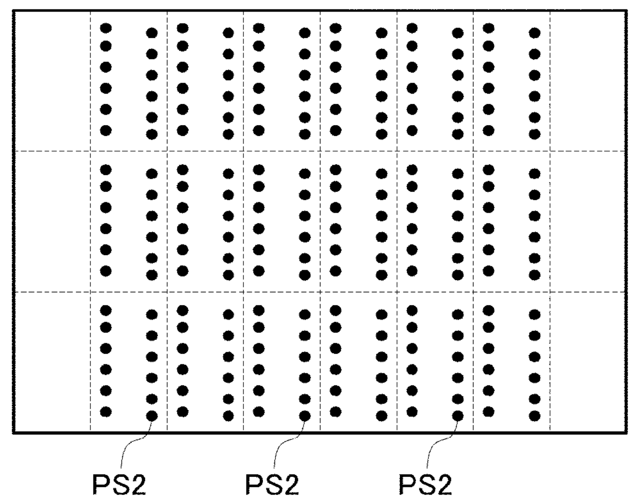
FIG. 8 B PRINT COIL PATTERNS
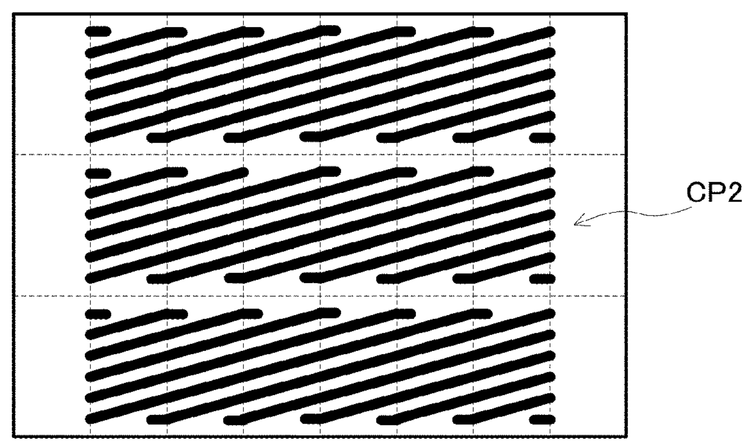

FIG. 9 A PREPARE MOTHER SHEET
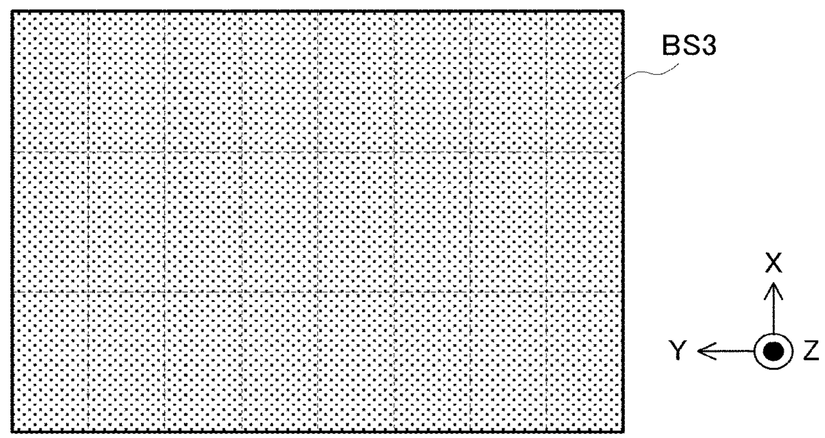
FIG. 9 B FORM THROUGH HOLES
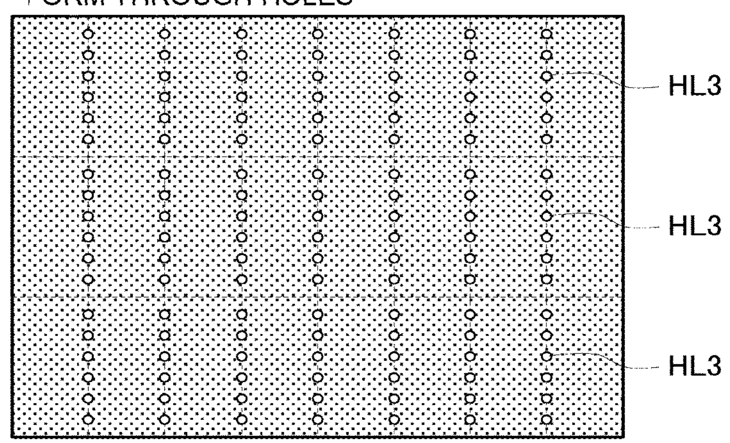
FIG. 9 C FILL CONDUCTIVE PASTE INTO HOLES
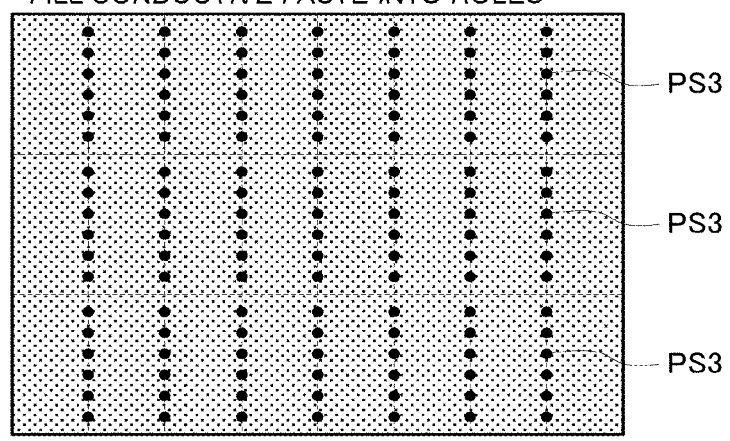

FIG. 10 A PREPARE MOTHER SHEET
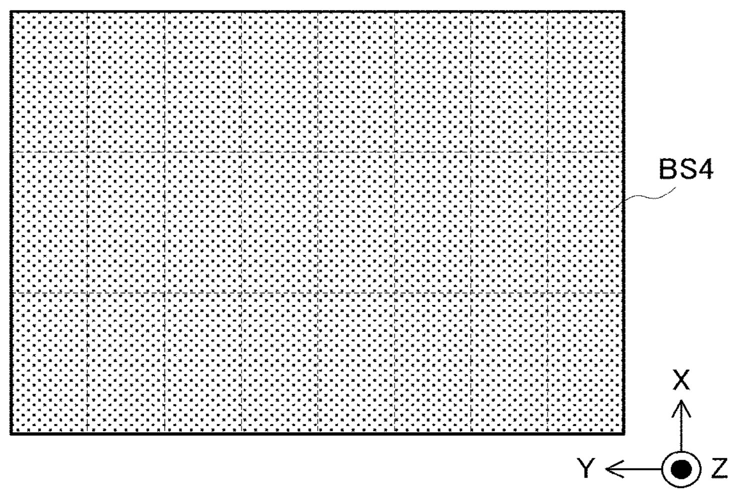
FIG. 10 B FORM THROUGH HOLES
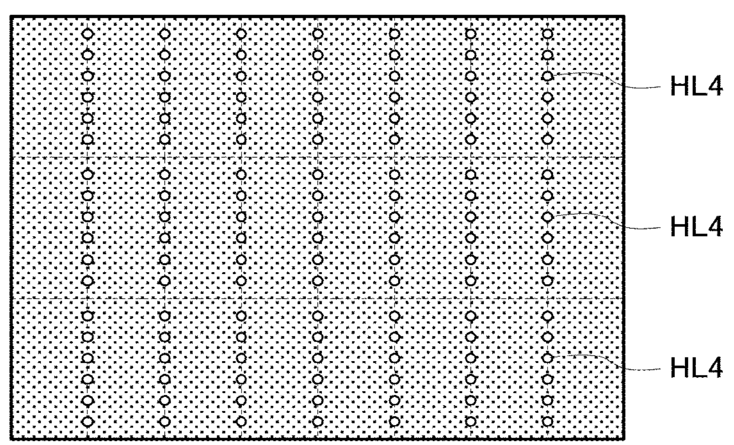

FIG. 11 A FILL CONDUCTIVE PASTE INTO HOLES
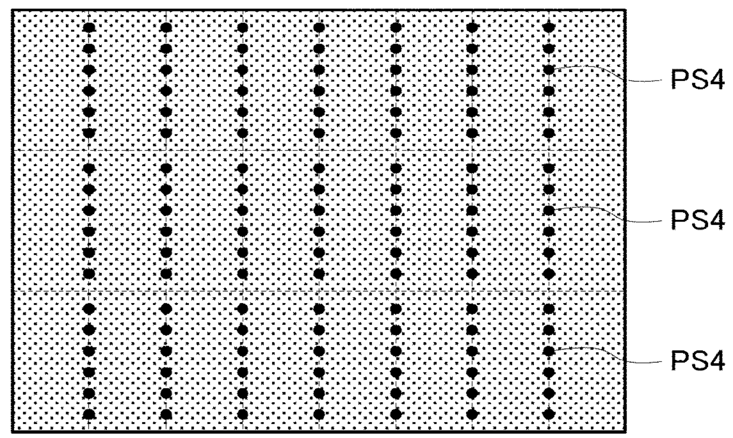
FIG. 11 B PRINT COIL PATTERNS
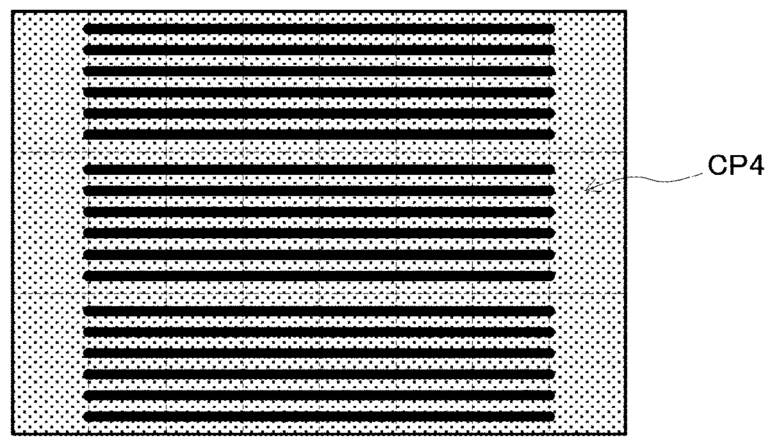

FIG. 12 A PREPARE MOTHER SHEET
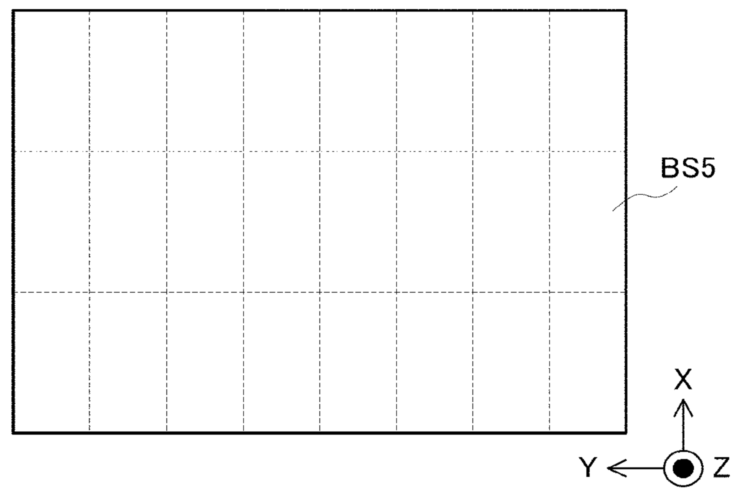
FIG. 12 B FORM THROUGH HOLES
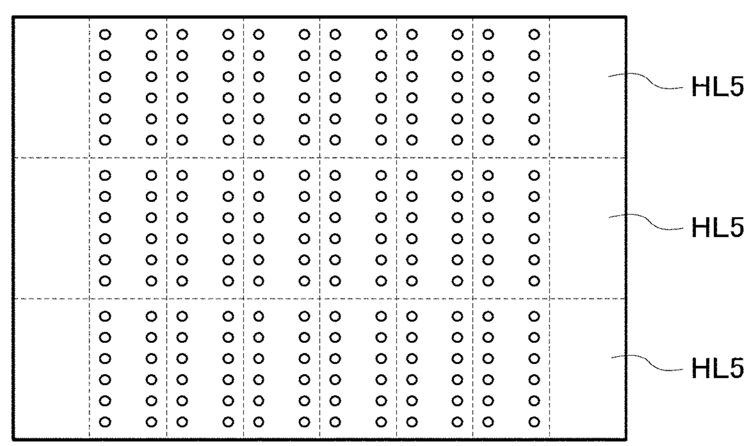

FIG. 13 A CONDUCTIVE PASTE INTO HOLES
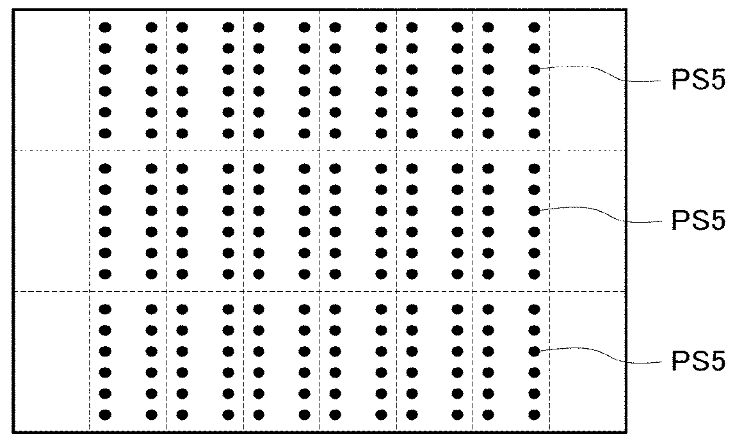
FIG. 13 B PRINT COIL PATTERNS

INDUCTOR ELEMENT

BACKGROUND OF THE INVENTION

1. Field of the Invention

The invention relates to an inductor element, and particularly relates to an inductor element used as an antenna coil for short-range radio communication.

2. Background Art

An element is known in which as in a coil element disclosed in Patent Document 1, a coil pattern is wound on the outer periphery of a multilayer body, namely, a magnetic material, by stacking magnetic sheets having the coil pattern printed on a principal surface thereof. In such an element, in order to prevent short-circuiting of the coil pattern, the multilayer body is coated with a non-magnetic sheet as an outermost layer. Furthermore, in order to reduce a direct current resistance component of the coil pattern, a line conductor connected in parallel with the coil pattern is provided within the non-magnetic sheet.

Patent Document 1: Japanese Unexamined Patent Application Publication No. 2007-49737

BRIEF SUMMARY OF THE INVENTION

However, if the line conductor is provided in the non-magnetic sheet, the height of the inductor element is increased. On the other hand, if the thickness of the non-magnetic sheet is decreased in order to decrease the height of the inductor element, an end portion of the non-magnetic sheet is ground in a process of manufacturing the inductor element (in particular, a barrel polishing step), and the conductor may be broken.

Therefore, a main object of the invention is to provide an inductor element which is able to reduce a risk of breaking a conductor.

An inductor element (1: corresponding to a reference sign in an embodiment. The same applies hereinafter) includes: a magnetic layer (12*b*); a first line conductor (20, 20, . . . ) provided on one principal surface of the magnetic layer; a second line conductor (18, 18, . . . ) provided on another principal surface of the magnetic layer; a side conductor (34*a*, 34*a*, . . . , 34*b*, 34*b*, . . . ) provided on a side surface of the magnetic layer to connect the first line conductor and the second line conductor in a coil shape; a first non-magnetic layer (12*c*) stacked at one principal surface side of the magnetic layer; a second non-magnetic layer (12*a*) stacked at another principal surface side of the magnetic layer; a third line conductor (22, 22, . . . ) provided within the first non-magnetic layer; a fourth line conductor (16, 16, . . . ) provided within the second non-magnetic layer; a first connection conductor (32*a*, 32*a*, . . . , 32*b*, 32*b*, . . . ) provided within the first non-magnetic layer to connect the third line conductor in parallel with the first line conductor; and a second connection conductor (30*a*, 30*a*, . . . , 30*b*, 30*b*, . . . , 36*a*, 36*a*, . . . , 36*b*, 36*b*, . . . ) provided within the second non-magnetic layer or on a side surface of the second non-magnetic layer to connect the fourth line conductor in parallel with the second line conductor.

Preferably, the third line conductor is provided so as to overlap the first line conductor as seen from a stacking direction, and the first connection conductor corresponds to a via-hole conductor extending along the stacking direction.

Preferably, the second connection conductor is formed within the second non-magnetic layer.

Further preferably, the fourth line conductor is provided so as to overlap the second line conductor as seen from the stacking direction, and the second connection conductor corresponds to a via-hole conductor extending along the stacking direction.

Preferably, the first line conductor has a first pattern, and the second line conductor has a second pattern different from the first pattern.

Preferably, the magnetic layer includes a plurality of stacked sheets (SH3, SH4) each having a magnetic material, the first non-magnetic layer includes a plurality of stacked sheets (SH5, SH6) each having a non-magnetic material, and the second non-magnetic layer includes a plurality of stacked sheets (SH0, SH1, SH2) each having the non-magnetic material.

According to the invention, a direct current resistance component of an inductor is reduced since the line conductor provided within the non-magnetic layer is connected in parallel with the line conductor provided on the magnetic layer and the line conductor provided within the other non-magnetic layer is connected in parallel with the other line conductor provided on the magnetic layer. Here, at least one of the two connection conductors for parallel connection is provided within the non-magnetic layer. Accordingly, a risk is reduced that the line conductor or the connection conductor provided within the non-magnetic layer is broken in a manufacturing process.

The above and other objects, features, and advantages of the invention will become more apparent from the following detailed description of embodiments of the invention with reference to the accompanying drawings.

BRIEF DESCRIPTION OF THE SEVERAL VIEWS OF THE DRAWINGS

FIG. 5A is a process diagram showing a part of a process of manufacturing the ceramic sheet SH1, and FIG. 5B is a process diagram showing another part of the process of manufacturing the ceramic sheet SH1.

FIG. 6A is a process diagram showing another part of the process of manufacturing the ceramic sheet SH1, and FIG. 6B is a process diagram showing still another part of the process of manufacturing the ceramic sheet SH1.

FIG. 7A is a process diagram showing a part of a process of manufacturing the ceramic sheet SH2, and FIG. 7B is a process diagram showing another part of the process of manufacturing the ceramic sheet SH2.

FIG. 8A is a process diagram showing another part of the process of manufacturing the ceramic sheet SH2, and FIG. 8B is a process diagram showing still another part of the process of manufacturing the ceramic sheet SH2.

FIG. 9A is a process diagram showing a part of a process of manufacturing a ceramic sheet SH3, FIG. 9B is a process diagram showing another part of the process of manufacturing a ceramic sheet SH3, and FIG. 9C is a process diagram showing another part of the process of manufacturing a ceramic sheet SH3.

FIG. 10A is a process diagram showing a part of a process of manufacturing the ceramic sheet SH4, and FIG. 10B is a process diagram showing another part of the process of manufacturing the ceramic sheet SH4.

FIG. 11A is a process diagram showing another part of the process of manufacturing the ceramic sheet SH4, and FIG. 11B is a process diagram showing still another part of the process of manufacturing the ceramic sheet SH4.

FIG. 12A is a process diagram showing a part of a process of manufacturing the ceramic sheet SH5, and FIG. 12B is a process diagram showing another part of the process of manufacturing the ceramic sheet SH5.

FIG. 13A is a process diagram showing another part of the process of manufacturing the ceramic sheet SH5, and FIG. 13B is a process diagram showing still another part of the process of manufacturing the ceramic sheet SH5.

DETAILED DESCRIPTION OF THE INVENTION

Figure 1:
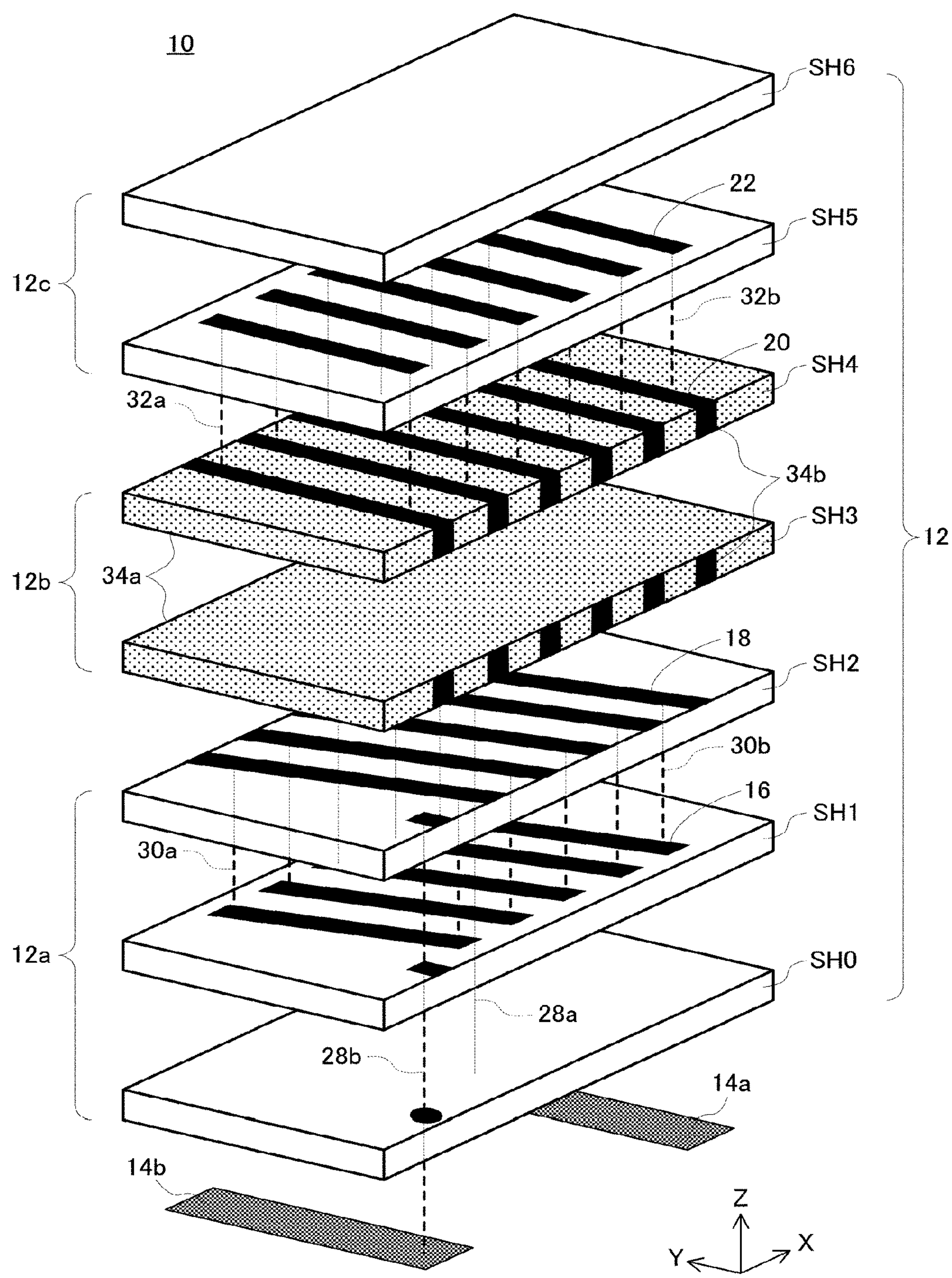
FIG. 1 is an exploded view showing a state where an antenna coil element according to an embodiment is taken apart.

With reference to FIG. 1, a coil antenna element 10 according to an embodiment is used as an antenna element for radio communications in the 13.56 MHz band and includes stacked ceramic sheets SH0 to SH6 which have rectangular principal surfaces. Of these ceramic sheets, the ceramic sheets SH0 to SH2, SH5, and SH6 include a non-magnetic material, and the ceramic sheets SH3 and SH4 include a magnetic material. As a result, a non-magnetic layer 12*a* is formed by the ceramic sheets SH0 to SH2, a magnetic layer 12*b* is formed by the ceramic sheets SH3 and SH4, and a non-magnetic layer 12*c* is formed by the ceramic sheets SH5 and SH6. That is, a multilayer body 12 forming the coil antenna element 10 has a multilayer structure in which the magnetic layer 12*b* is held between the non-magnetic layers 12*a* and 12*c*.

The long sides and the short sides of a rectangular forming a principal surface of the multilayer body 12 extend along an X axis and a Y axis, respectively, and the thickness of the multilayer body 12 increases along a Z axis. Conductive terminals 14*a* and 14*b* are provided on a lower surface of the multilayer body 12 and at positions corresponding to both ends thereof in an X-axis direction.

The sizes of the principal surfaces of the ceramic sheets SH0 to SH6 are the same. The material of the ceramic sheets SH0 to SH2, SH5, and SH6 is a non-magnetic (relative permeability: 1) ferrite, and the material of the ceramic sheets SH3 and SH4 is a magnetic (relative permeability: 100 to 120) ferrite. Furthermore, one principal surface and the other principal surface of the multilayer body 12 or each of the ceramic sheets SH0 to SH6 is referred to as "upper surface" and "lower surface" as necessary.

Figure 2:
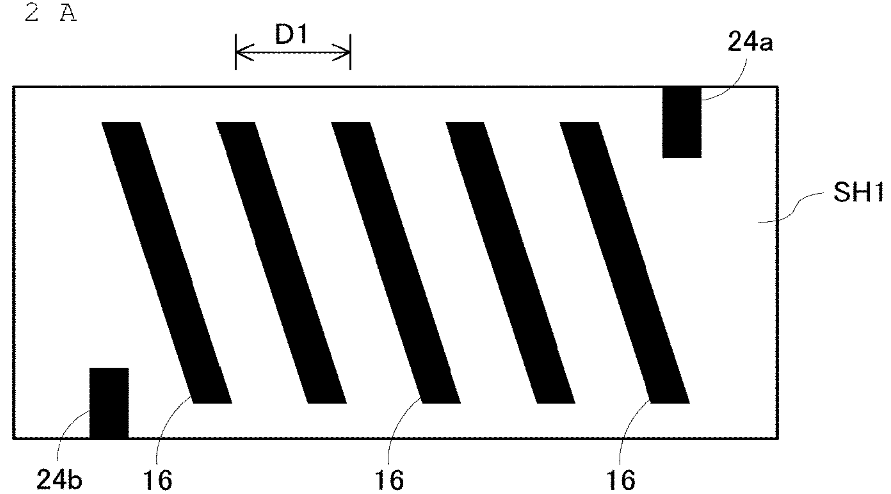
FIG. 2A is a plan view showing an example of a ceramic sheet SH1 forming the antenna coil element.
FIG. 2B is a plan view showing an example of a ceramic sheet SH2 forming the antenna coil element.
Figure 2:
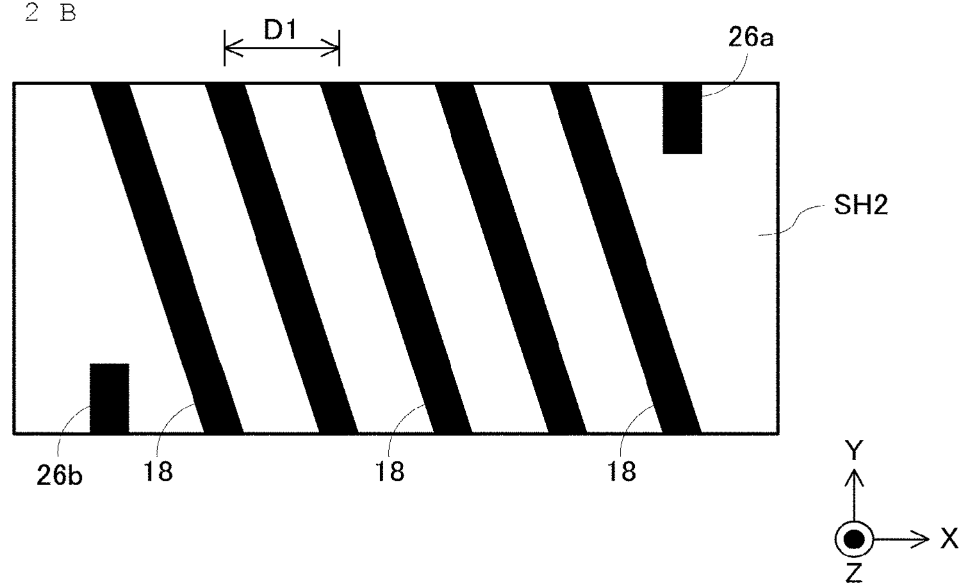
Figure 3:
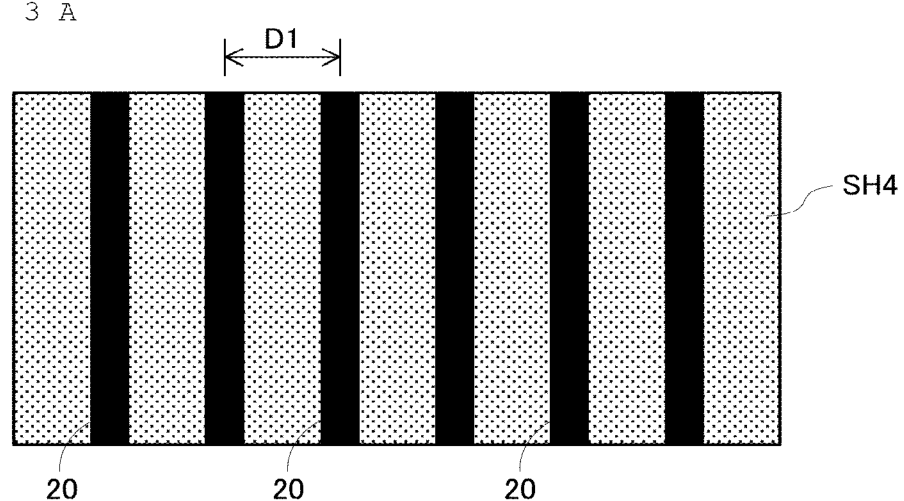
FIG. 3A is a plan view showing an example of a ceramic sheet SH4 forming the antenna coil element.
FIG. 3B is a plan view showing an example of a ceramic sheet SH5 forming the antenna coil element.
Figure 3:
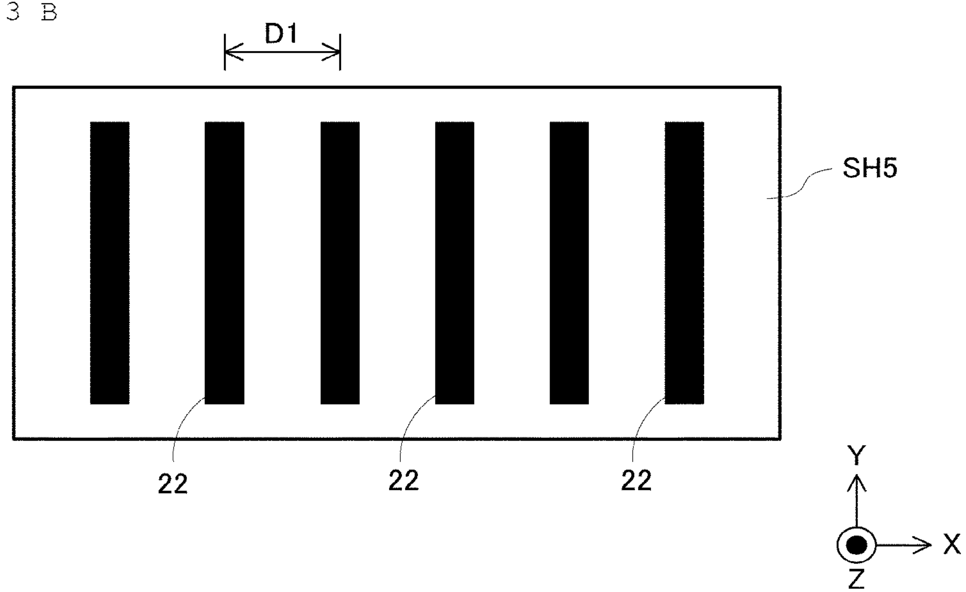

As shown in FIGS. 2A and 2B, a plurality of line conductors 16, 16, . . . are formed on the upper surface of the ceramic sheet SH1, and a plurality of line conductors 18, 18, . . . are formed on the upper surface of the ceramic sheet SH2. In addition, as shown in FIGS. 3A and 3B, a plurality of line conductors 20, 20, . . . are formed on the upper surface of the ceramic sheet SH4, and a plurality of line conductors 22, 22, . . . are formed on the upper surface of the ceramic sheet SH5.

It should be noted that no line conductor is present on the upper surface of the ceramic sheet SH3, and the magnetic material appears on the entire upper surface. Similarly, no line conductor is present also on the upper surfaces of the non-magnetic sheets SH0 and SH6, and the non-magnetic material appears on the entire upper surfaces.

With reference to FIG. 2A, the line conductors 16 extend in an oblique direction with respect to the Y axis and are arranged so as to be spaced apart from each other by distances Dl in the X-axis direction. Both longitudinal ends of each line conductor 16 are present inward of both ends, in a Y-axis direction, of the upper surface of the ceramic sheet SH1. In addition, the two line conductors 16 at both ends in the X-axis direction are disposed inward of both ends, in the X-axis direction, of the upper surface of the ceramic sheet SH1.

With reference to FIG. 2B, the line conductors 18 extend in an oblique direction with respect to the Y axis and are arranged so as to be spaced apart from each other by distances D1 in the X-axis direction. Both longitudinal ends of each line conductor 18 reach both ends, in the Y-axis direction, of the upper surface of the ceramic sheet SH2. In addition, the two line conductors 18 at both ends in the X-axis direction are disposed inward of both ends, in the X-axis direction, of the upper surface of the ceramic sheet SH2.

With reference to FIG. 3A, the line conductors 20 extend in an oblique direction with respect to the Y axis and are arranged so as to be spaced apart from each other by distances D1 in the X-axis direction. Both longitudinal ends of each line conductor 20 reach both ends, in the Y-axis direction, of the upper surface of the ceramic sheet SH4. In addition, the two line conductors 20 at both ends in the X-axis direction are disposed inward of both ends, in the X-axis direction, of the upper surface of the ceramic sheet SH4.

With reference to FIG. 3B, the line conductors 22 extend in an oblique direction with respect to the Y axis and are arranged so as to be spaced apart from each other by distances D1 in the X-axis direction. Both longitudinal ends of each line conductor 22 are present inward of both ends, in the Y-axis direction, of the upper surface of the ceramic sheet SH5. In addition, the two line conductors 22 at both ends in the X-axis direction are disposed inward of both ends, in the X-axis direction, of the upper surface of the ceramic sheet SH5.

The arrangement of the line conductors 16 on the ceramic sheet SH1 coincides with the arrangement of the line conductors 18 on the ceramic sheet SH2 except for both side portions in the Y-axis direction. Therefore, the line conductors 16 overlap the line conductors 18 when being seen from a Z-axis direction. Similarly, the arrangement of the line conductors 22 on the ceramic sheet SH5 coincides with the arrangement of the line conductors 20 on the ceramic sheet SH4 except for both side portions in the Y-axis direction.

Therefore, the line conductors 22 overlap the line conductors 20 when being seen from the Z-axis direction.

In addition, the distance in the X-axis direction from one end to the other end of each line conductor 18 provided on the ceramic sheet SH2 corresponds to "D1", and the interval between the two adjacent line conductors 20 on the ceramic sheet SH4 also corresponds to "D1". Furthermore, the position of the one end of each line conductor 18 is adjusted to a position which overlaps one end of the line conductor 20 as seen from the Z-axis direction, and the position of the other end of each line conductor 18 is adjusted to a position which overlaps the other end of the line conductor 20 as seen from the Z-axis direction. In addition, the number of the line conductors 18 is smaller than the number of the line conductors 20 by one.

Therefore, when being seen from the Z-axis direction, the line conductors 18 and 20 are arranged alternately in the X-axis direction. In addition, the one end of each line conductor 18 overlaps the one end of the line conductor 20, and the other end of each line conductor 18 overlaps the other end of the line conductor 20.

Plate-shaped conductors 24*a* and 24*b* are additionally formed on the upper surface of the ceramic sheet SH1. Similarly, plate-shaped conductors 26*a* and 26*b* are also formed on the upper surface of the ceramic sheet SH2. The plate-shaped conductors 24*a* and 26*a* are provided at a position which is slightly at the negative side of a positive side end portion in the X-axis direction and corresponds to a positive side end portion in the Y-axis direction. In addition, the plate-shaped conductors 24*b* and 26*b* are provided at a position which is slightly at the positive side of a negative side end portion in the X-axis direction and corresponds to a negative side end portion in the Y-axis direction.

The distance in the X-axis direction from one end of the line conductor 18 present at the most positive side to the plate-shaped conductor 26*a* corresponds to "D1", and the distance in the X-axis direction from the other end of the line conductor 18 present at the most negative side to the plate-shaped conductor 26*b* also corresponds to "D1" . In addition, when being seen from the Z-axis direction, the plate-shaped conductors 24*a* and 24*b* overlap the plate-shaped conductors 26*a* and 26*b*, respectively.

As shown in FIG. 1, a via-hole conductor 28*a* extends through the ceramic sheets SH0 to SH2 in the Z-axis direction at the positions where the plate-shaped conductors 24*a* and 26*a* are formed. In addition, a via-hole conductor 28*b* extends through the ceramic sheets SH0 to SH2 in the Z-axis direction at the positions where the plate-shaped conductors 24*b* and 26*b* are formed. Therefore, the plate-shaped conductors 24*a* and 26*a* are connected to a conductive terminal 14*a* via the via-hole conductor 28*a*. The plate-shaped conductors 24*b* and 26*b* are connected to a conductive terminal 14*b* via the via-hole conductor 28*b*.

Figure 4:
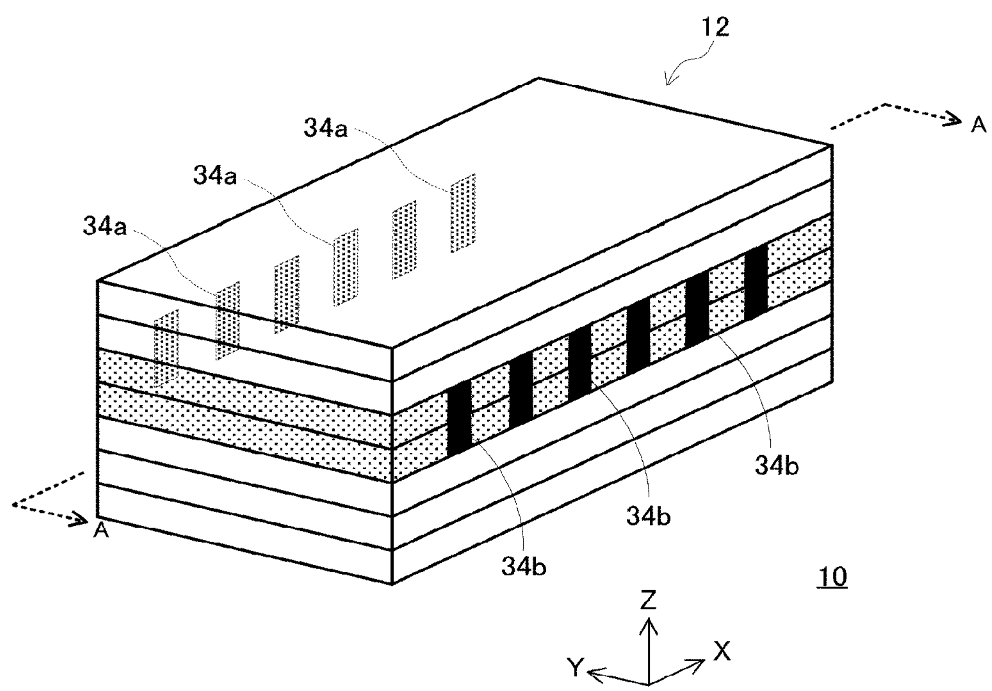
FIG. 4 is a perspective view showing the appearance of the antenna coil element according to the embodiment.

With further reference to FIG. 4, a plurality of side conductors 34*a*, 34*a*, . . . each extending in the Z-axis direction are formed on a side surface, at the positive side in the Y-axis direction, of the magnetic layer 12*b*. In addition, a plurality of side conductors 34*b*, 34*b*, . . . each extending in the Z-axis direction are formed on a side surface, at the negative side in the Y-axis direction, of the magnetic layer 12*b*.

The number of the side conductors 34*a* coincides with the number of the line conductors 20, and the number of the side conductors 34*b* also coincides with the number of the line conductors 20. In addition, the side conductors 34*a* or 34*b* are arranged so as to be spaced apart from each other at distances D1 in the X-axis direction. Furthermore, the side conductor 34*a* present at the most positive side in the X-axis direction is connected to the plate-shaped conductor 26*a*, and the side conductor 34*b* present at the most negative side in the X-axis direction is connected to the plate-shaped conductor 26*b*.

Therefore, a coil conductor (wound body) is formed by the line conductors 18 formed on the ceramic sheet SH2, the line conductors 20 formed on the ceramic sheet SH4, and the side conductors 34*a* and 34*b*. Since the magnetic material is present at the inner side of the coil conductor, the coil conductor serves as an inductor.

As shown in FIG. 1, via-hole conductors 30*a*, 30*a*, . . . extend through the ceramic sheet SH2 in the Z-axis direction at the positions of the one ends of the line conductors 16, 16, . . . , and via-hole conductors 30*b*, 30*b*, . . . extend through the ceramic sheet SH2 in the Z-axis direction at the positions of the other ends of the line conductors 16, 16, . . . . The two line conductors 16 and 18 that overlap each other when being seen from the Z-axis direction are connected in parallel via the via-hole conductors 30*a* and 30*b*. The non-magnetic material is interposed between the line conductors 16 and 18 connected in parallel, and a direct current resistance component of the inductor is reduced by the line conductor 16.

Similarly, via-hole conductors 32*a*, 32*a*, . . . extend through the ceramic sheet SH5 in the Z-axis direction at the positions of one ends of the line conductors 22, 22, . . . . In addition, via-hole conductors 32*b*, 32*b*, . . . extend through the ceramic sheet SH5 in the Z-axis direction at the positions of the other ends of the line conductors 22, 22, . . . . The two line conductors 20 and 22 that overlap each other when being seen from the Z-axis direction are connected in parallel via the via-hole conductors 32*a* and 32*b*. The non-magnetic material is interposed between the line conductors 20 and 22 connected in parallel, and the direct current resistance component of the inductor is also reduced by the line conductors 22.

The ceramic sheet SH1 is manufactured in a manner shown in FIGS. 5A and 5B and FIGS. 6A and 6B. First, a ceramic green sheet formed from a non-magnetic ferrite material is prepared as a mother sheet BS1 (see FIG. 5A). Here, a plurality of broken lines extending in the X-axis direction and the Y-axis direction denote cutout positions.

Next, a plurality of through holes HL1, HL1, . . . are formed in the mother sheet BS1 so as to correspond to the vicinities of intersections of the broken lines (see FIG. 5B), and a conductive paste PS1 is filled into the through holes HL1 (see FIG. 6A). The filled conductive paste PS1 forms the via-hole conductors 28*a* or 28*b*. When the filling of the conductive paste PS1 is completed, coil patterns CP1 forming the line conductors 16 and the plate-shaped conductors 24*a* and 24*b* are printed on one principal surface of the mother sheet BS1 (see FIG. 6B).

It should be noted that the ceramic sheet SH0 is manufactured by forming, in a motherboard, the same through holes as the through holes HL1 shown in FIG. 5B, filling a conductive paste into the through holes, and printing the conductive terminals 14*a* and 14*b* on a lower surface thereof.

The ceramic sheet SH2 is manufactured in a manner shown in FIGS. 7A and 7B and FIGS. 8A and 8B. First, a ceramic green sheet formed from a non-magnetic ferrite material is prepared as a mother sheet BS2 (see FIG. 7A). Here, a plurality of broken lines extending in the X-axis direction and the Y-axis direction denote cutout positions.

Next, a plurality of through holes HL2, HL2, . . . are formed in the mother sheet BS2 so as to correspond to positions at both sides of the broken lines extending in the X-axis direction (see FIG. 7B), and a conductive paste PS2 is filled into the through holes HL2 (see FIG. 8A). A part of the conductive paste PS2 forms the via-hole conductors 28*a* or 28*b*, and another part of the conductive paste PS2 forms the via-hole conductors 30*a* or 30*b*. When the filling of the conductive paste PS2 is completed, coil patterns CP2 forming the line conductors 18 and the plate-shaped conductors 26*a* and 26*b* are printed on one principal surface of the mother sheet BS2 (see FIG. 8B).

The ceramic sheet SH3 is manufactured in a manner shown in FIGS. 9A to 9C. First, a ceramic green sheet formed from a magnetic ferrite material is prepared as a mother sheet BS3 (see FIG. 9A). Here, a plurality of broken lines extending in the X-axis direction and the Y-axis direction denote cutout positions. Next, a plurality of through holes HL3, HL3, . . . are formed in the mother sheet BS3 along the broken lines extending in the X-axis direction (see FIG. 9B), and a conductive paste PS3 which is to form the side conductors 34*a* or 34*b* is filled into the through holes HL3 (see FIG. 9C).

The ceramic sheet SH4 is manufactured in a manner shown in FIGS. 10A and 10B and FIGS. 11A and 11B. First, a ceramic green sheet formed from a magnetic ferrite material is prepared as a mother sheet BS4 (see FIG. 10A). Here, a plurality of broken lines extending in the X-axis direction and the Y-axis direction denote cutout positions.

Next, a plurality of through holes HL4, HL4, . . . are formed in the mother sheet BS4 along the broken lines extending in the X-axis direction (see FIG. 10B), and a conductive paste PS4 which is to form the side conductors 34*a* or 34*b* is filled into the through holes HL4 (see FIG. 11A). When the filling of the conductive paste PS4 is completed, coil patterns CP4 which are to form the line conductors 20 is printed on one principal surface of the mother sheet BS4 (see FIG. 11B).

The ceramic sheet SH5 is manufactured in a manner shown in FIGS. 12A and 12B and FIGS. 13A and 13B. First, a ceramic green sheet formed from a non-magnetic ferrite material is prepared as a mother sheet BS5 (see FIG. 12A). Here, a plurality of broken lines extending in the X-axis direction and the Y-axis direction denote cutout positions.

Next, a plurality of through holes HL5, HL5, . . . are formed in the mother sheet BS5 so as to correspond to positions at both sides of the broken lines extending in the X-axis direction (see FIG. 12B), and a conductive paste PS5 which is to form the via-hole conductors 32*a* or 32*b* is filled into the through holes HL5 (see FIG. 13A). When the filling of the conductive paste PS5 is completed, coil patterns CP5 which are to form the line conductors 22 are printed on one principal surface of the mother sheet BS5 (see FIG. 13B).

Figure 14:
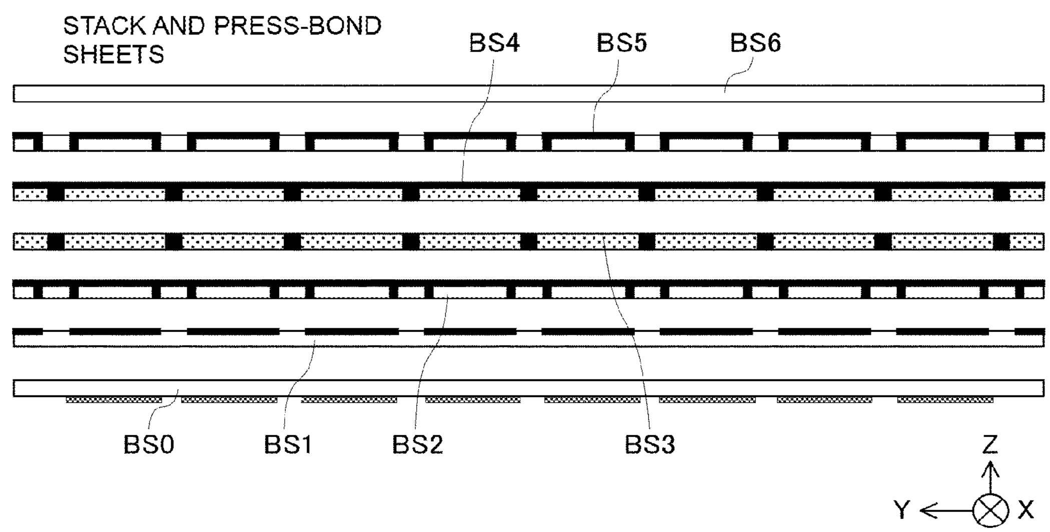
FIG. 14A is a process diagram showing a part of a process of manufacturing the antenna coil element.
FIG. 14B is a process diagram showing another part of the process of manufacturing the antenna coil element.
FIG. 14C is a process diagram showing another part of the process of manufacturing the antenna coil element.
Figure 14:
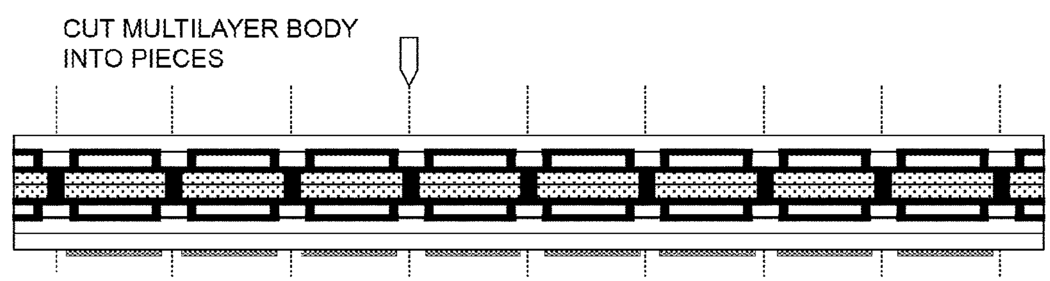
Figure 14:
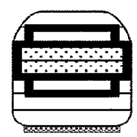

The mother sheets BS1 to BS5 having been subjected to the above-described steps, a mother sheet BS0 corresponding to the ceramic sheet SH0, and a mother sheet BS6 corresponding to the ceramic sheet SH6 are press-bonded to each other in a state of being stacked in a manner shown in FIG. 14A. According to FIG. 14A, the mother sheets BS0 to BS6 are stacked in this order. At that time, the position where each sheet is stacked is adjusted such that broken lines assigned to the respective sheets overlap each other as seen from the Z-axis direction.

Figure 15:
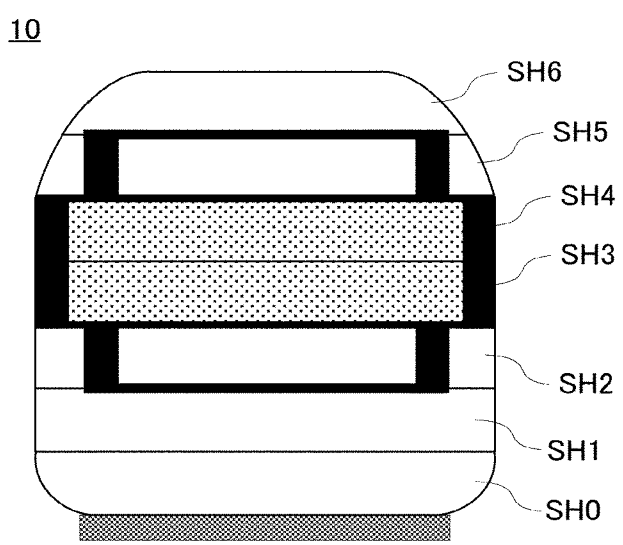
FIG. 15 is a cross-sectional view showing a cross section of the antenna coil element manufactured through the manufacturing process shown in FIG. 14C.

The press-bonded multilayer body is cut along the above broken lines into pieces by being prior to burning (see FIG. 14B). Then, each piece is subjected to a series of processes such as barrel polishing, burning, and plating (see FIG. 14C), thereby completing an antenna coil element 10 shown in FIG. 15. According to FIG. 15, each corner (specifically, the ceramic sheets SH0 and SH6) of a rectangular parallelepiped forming the antenna coil element 10 is rounded by barrel polishing.

As is understood from the above description, the line conductors 20 are provided on one principal surface of the magnetic layer 12*b*, and the line conductors 18 are provided on the other principal surface of the magnetic layer 12*b*. In addition, the side conductors 34*a* and 34*b* are provided on the side surfaces of the magnetic layer 12*b* to connect the line conductors 18 and 29 in a coil shape. The non-magnetic layer 12*c* is stacked at the one principal surface side of the magnetic layer 12*b*, and the non-magnetic layer 12*a* is stacked at the other principal surface side of the magnetic layer 12*b*. The line conductors 22 are provided within the non-magnetic layer 12*c*, and the line conductors 16 are provided within the non-magnetic layer 12*a*. The via-hole conductors 32*a* and 32*b* are provided within the non-magnetic layer 12*c* to connect the line conductors 22 in parallel with the line conductors 20. In addition, the via-hole conductors 30*a* and 30*b* are provided within the non-magnetic layer 12*a* to connect the line conductors 16 in parallel with the line conductors 18.

The direct current resistance component of the inductor is reduced by connecting the line conductors 22, which are provided within the non-magnetic layer 12*c*, in parallel with the line conductors 20, which are provided on the one principal surface of the magnetic layer 12*b*, and connecting the line conductors 16, which are provided within the non-magnetic layer 12*a*, in parallel with the line conductors 18, which are provided on the other principal surface of the magnetic layer 12*b*.

Here, the via-hole conductors 32*a* and 32*b* for connecting the line conductors 20 and 22 in parallel are provided within the non-magnetic layer 12*c*, and the via-hole conductors 30*a* and 30*b* for connecting the line conductors 16 and 18 in parallel are also provided within the non-magnetic layer 12*a*. Accordingly, a risk is reduced that the conductors provided to the non-magnetic layer 12*a* or 12*c* are broken in the manufacturing process (barrel polishing).

Figure 16:
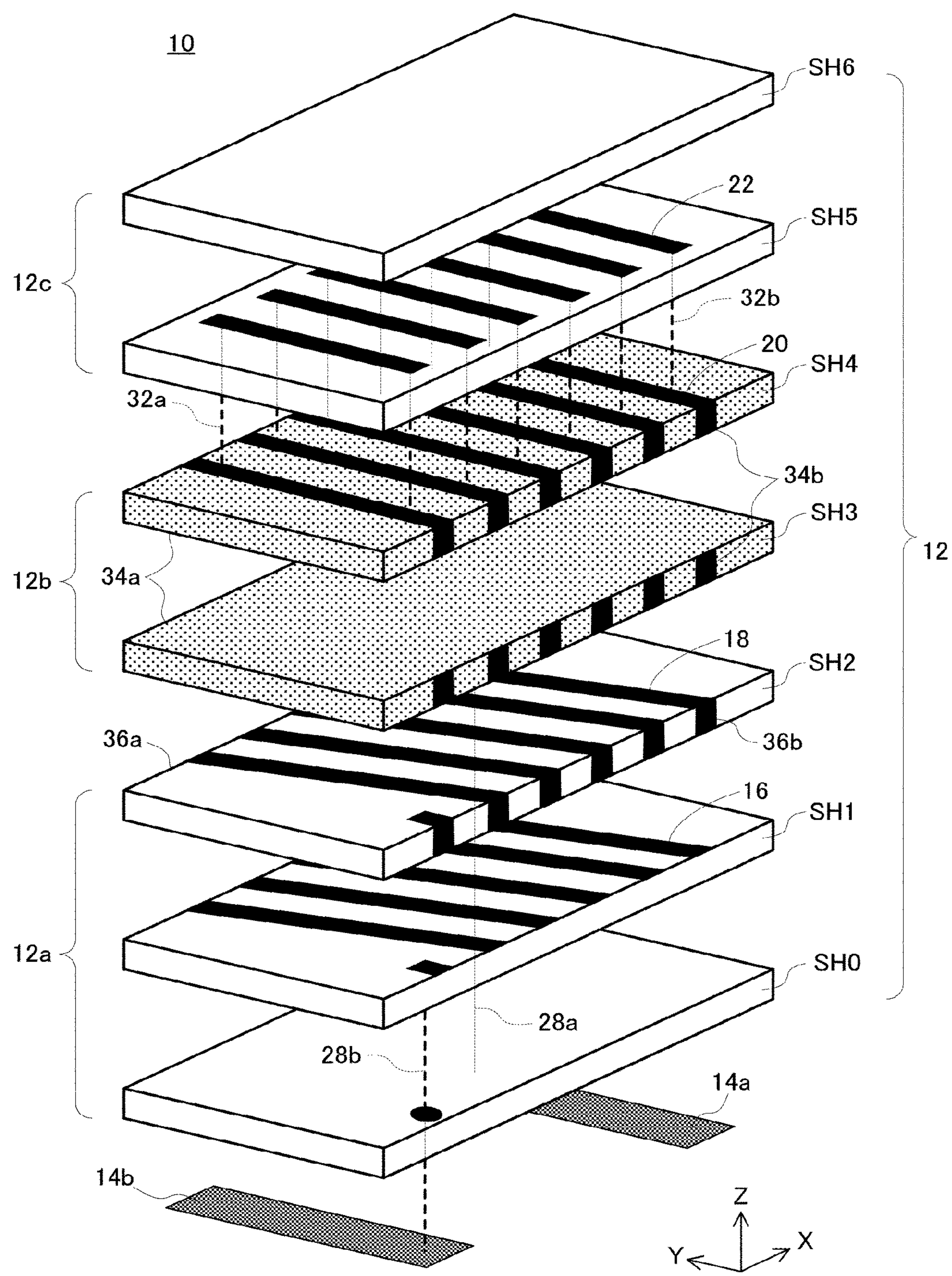
FIG. 16 is an exploded view showing a state where an antenna coil element according to another embodiment is taken apart.
Figure 17:
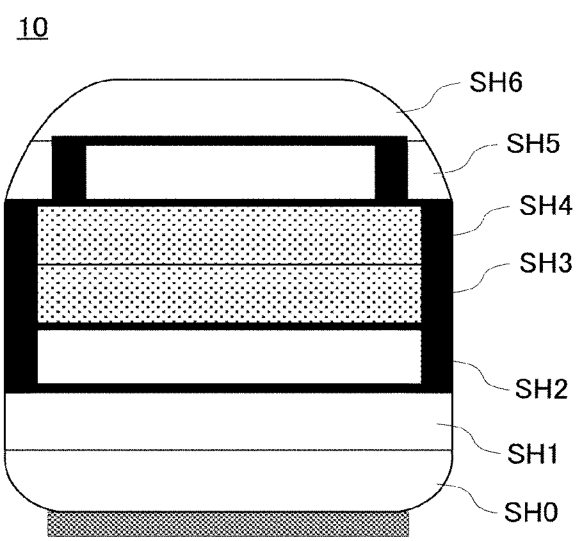
FIG. 17 is a cross-sectional view showing a cross section of the antenna coil element according to the other embodiment.

In the embodiment, the line conductors 16 provided within the non-magnetic layer 12*a* are connected in parallel with the line conductors 18 on the magnetic layer 12*b* via the via-hole conductors 30*a* and 30*b*. However, as shown in FIG. 16, the one end and the other end of each line conductor 16 provided within the non-magnetic layer 12*a* may be extended to both ends, in the Y-axis direction, of the ceramic sheet SH1, side conductors 36*a* and 16*b* may be formed on both side surfaces, in the Y-axis direction, of the ceramic sheet SH2, and the line conductors 16 and 18 may be connected in parallel via the side conductors 36*a* and 36*b*. In this case, the antenna coil element 10 completed through barrel polishing has a structure shown in FIG. 17.

In addition, in the embodiment, whereas the line conductors 18 extend in the oblique direction with respect to the Y axis, the line conductors 20 extend in the Y-axis direction. However, the directions in which the line conductors 18 and 20 extend may be different from those in the embodiment as long as the line conductors 18 and 20 are connected in a coil shape via the side conductors 34*a* and 34*b*.

Furthermore, in the embodiment, the plate-shaped conductors 24*a* and 26*a* are connected to the conductive terminal 14*a* via the via-hole conductor 28*a*, and the plate-shaped conductors 24*b* and 26*b* are connected to the conductive terminal 14*b* via the via-hole conductor 28*b* (see FIGS. 1, 2A, and 2B). However, when the side conductors 34*a* and

34*b* are mounted as terminal electrodes on a printed wiring board, the plate-shaped conductors 24*a*, 24*b*, 26*a*, and 26*b*, the via-hole conductors 28*a* and 28*b*, and the conductive terminals 14*a* and 14*b* are unnecessary.

REFERENCE SIGNS LIST

10 antenna coil element
SH0 to SH6 ceramic sheet
12*a*, 12*c* non-magnetic layer
12*b* magnetic layer
16, 18, 20, 22 line conductor
28*a*, 28*b*, 30*a*, 30*b*, 32*a*, 32*b* via-hole conductor
34*a*, 34*b*, 36*a*, 36*b* side conductor

The invention claimed is:

1. An inductor element comprising:
a magnetic layer;
a first line conductor provided on one principal surface of the magnetic layer;
a second line conductor provided on another principal surface of the magnetic layer;
a side conductor provided on a side surface of the magnetic layer to connect the first line conductor and the second line conductor in a coil shape;
a first non-magnetic layer stacked at one principal surface side of the magnetic layer;
a second non-magnetic layer stacked at another principal surface side of the magnetic layer;
a third line conductor provided within the first non-magnetic layer;
a fourth line conductor provided within the second non-magnetic layer;
a first connection conductor provided within the first non-magnetic layer to connect the third line conductor in parallel with the first line conductor; and
a second connection conductor provided within the second non-magnetic layer or on a side surface of the second non-magnetic layer to connect the fourth line conductor in parallel with the second line conductor.

2. The inductor element according to claim 1, wherein
the third line conductor is provided so as to overlap the first line conductor as seen from a direction perpendicular to the one principal surface of the magnetic layer, and
the first connection conductor corresponds to a via-hole conductor extending along the direction perpendicular to the one principal surface of the magnetic layer.

3. The inductor element according to claim 1, wherein the second connection conductor is formed within the second non-magnetic layer.

4. The inductor element according to claim 3, wherein
the fourth line conductor is provided so as to overlap the second line conductor as seen from the direction perpendicular to the one principal surface of the magnetic layer, and
the second connection conductor corresponds to a via-hole conductor extending along the direction perpendicular to the one principal surface of the magnetic layer.

5. The inductor element according to claim 1, wherein
the first line conductor has a first pattern, and
the second line conductor has a second pattern different from the first pattern.

6. The inductor element according to claim 1, wherein
the magnetic layer includes a plurality of stacked sheets each having a magnetic material,
the first non-magnetic layer includes a plurality of stacked sheets each having a non-magnetic material, and
the second non-magnetic layer includes a plurality of stacked sheets each having the non-magnetic material.

7. The inductor element according to claim 1, wherein the second non-magnetic layer comprises one principal surface of the second non-magnetic layer facing the another principal surface of the magnetic layer and another principal surface of the second non-magnetic layer that is opposite from the one principal surface of the second non-magnetic layer, a conductive terminal is provided on the another principal surface of the second non-magnetic layer.

* * * * *